United States Patent [19]
Duque-Antón et al.

[11] Patent Number: 5,987,055
[45] Date of Patent: *Nov. 16, 1999

[54] SPREAD-SPECTRUM BASED CELLULAR MOBILE RADIO SYSTEM, AND A CONTROL ARRANGEMENT, A RADIO BASED STATION, AND A MOBILE RADIO STATION

[75] Inventors: Jesus-Manuel Duque-Antón; Dietmar W. Kunz, both of Aachen; Bernhard J. Rüber, Roetgen; Meinhard D. Ullrich, Köln, all of Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/404,079

[22] Filed: Mar. 14, 1995

[30] Foreign Application Priority Data

Mar. 18, 1994 [EP] European Pat. Off. .............. 94200695

[51] Int. Cl.$^6$ .............................. H04B 15/00; H04K 1/00; H04L 27/30
[52] U.S. Cl. ............................ 375/200; 455/446; 379/112
[58] Field of Search ................................ 375/200–208, 375/285, 296, 346; 455/63, 67.3, 296, 446–448, 449; 370/335; 379/113, 112, 134, 133, 136, 137

[56] References Cited

U.S. PATENT DOCUMENTS

| 5,179,722 | 1/1993 | Gunmar et al. ...................... 455/33.1 |
| 5,268,930 | 12/1993 | Sendyk et al. ...................... 375/232 |
| 5,287,544 | 2/1994 | Menich et al. ...................... 455/63 X |
| 5,293,640 | 3/1994 | Gunmar et al. ...................... 455/63 |
| 5,319,796 | 6/1994 | Grube et al. ...................... 455/63 |
| 5,428,818 | 6/1995 | Median et al. ...................... 455/63 |
| 5,787,352 | 7/1998 | Benveniste ...................... 455/452 |

OTHER PUBLICATIONS

2nd International Conference on Universal Personal Communications ... Conference Record, vol. II, The Institute of Electrical and Electronics Engineers, INc., IEEE Communications Society, ... Oct. 12–15, 1993, "An Analysis of Error Probability of a Cellular CDMA Downlink With M–ARY DPSK in a Rician/Raleigh Fading Environment" pp. 965–969, section III A abstract.

"Channel Assignment for Cellular Radio Using Simulated Annealing", by Manuel Duque–Anton et al, IEEE Transactions on Vehicular Technology, vol. 42, No. 1, Feb. 1993, Abstract section III B, IV A., pp. 14–21.

*Primary Examiner*—Chi H. Pham
*Assistant Examiner*—Bryan Webster

[57] ABSTRACT

A spread-spectrum based cellular mobile radio system resolves average mutual interferences ($I^u(j)_{av}$, $I^d(j)_{av}$) between radio zones j, j') from a total interference experienced in a radio zone (j), using statistical methods. First, interference measurements are carried out in the radio zones (Z1, Z2), and data is transmitted to a central control arrangement (CA) which resolves the average mutual interferences. Then, these average mutual interference ($I^u(j)_{av}$, $I^d(j)_{av}$) are used in an optimization process for acquiring access control parameters (x) for controlling traffic per radio zone (Z1, Z2). In the optimizing process various objective functions may be applied so as to fulfil system operator demands. Thus, system overload is avoided, and further, a flexible tool is provided for satisfying operator demands.

16 Claims, 3 Drawing Sheets

SPREAD-SPECTRUM BASED CELLULAR MOBILE RADIO SYSTEM, AND A CONTROL ARRANGEMENT, A RADIO BASED STATION, AND A MOBILE RADIO STATION

BACKGROUND OF THE INVENTION

1. Field of the Invention

The present invention relates to a spread-spectrum based cellular mobile radio system comprising at least two radio base stations covering radio zones, and a plurality of mobile radio stations. The applied spread-spectrum technique can be a so-called direct sequence spread spectrum technique or a so-called frequency hopping spread spectrum technique, or the like.

The present invention further relates to a control arrangement, a radio base station, and a mobile radio station for use in such a system.

2. Discussion of the Related Art

A spread-spectrum based cellular mobile radio system of the above kind is known from the International Patent Application WO 91/07037, which discloses a CDMA (Code Division Multiple Access) spread-spectrum cellular mobile telephony system. Disclosed is a CDMA system with an overall power control so as combat the so-called near-far problem and thus to maximize the system capacity in terms of the number of simultaneous telephone calls that may be handled in a given system bandwidth. In general terms, the disclosed system tries to achieve in real-time that under fading conditions, all signals received in a radio base station from mobile radio stations arrive at the radio base station with equal field strength. It is thus avoided that otherwise weak signals are not overshadowed by much stronger signals arriving at the radio base station. Such weak signals would then not or hardly not be detectable. In WO 91/07037, with an overall real-time power control, it is attempted to realize favourable interference conditions. A CDMA mobile radio system is also disclosed in a patent application filed by the present applicant, namely European application No. 94 200 479.7, filed Feb. 25, 1994, due to a more sophisticated demodulation, the latter system being less prone to the so-called near-far problem the patent application WO 91/07037 is aiming to combat. Although the known systems achieve an increase in system capacity as compared to other CDMA systems, these systems do not allow for a more sophisticated control such as a controlled access of mobile radio stations to radio zones under interference conditions.

SUMMARY OF THE INVENTION

It is an object of the present invention to provide a spread-spectrum based cellular mobile radio system of the above kind allowing access or traffic control under interference conditions, inter alia.

To this end the spread-spectrum radio system according to the present invention is characterized in that the system comprises statistics based inter-zone interference establishing means for establishing inter-zone interference information introduced in a given zone per unit of traffic in another zone. Thus, access control data are obtained for either semi-automatically or fully automatically controlling access of mobile radio stations to radio zones. The present invention is based upon the insight that, for the purpose of access control, when using statistical methods, pair-wise interference introduced by mobile radio stations in a neighbouring radio zone or more remote radio zone with regard to a given radio zone can be decomposed from general interference measurements. Such a control is not time-critical since using statistics requires many events to be significant. The present invention is further based upon the insight that admitting too many mobile radio stations in one radio zone could cause an overload situation in a neighbouring radio zone, while intra-zone interference causes less interference problems when using a proper CDMA technique.

In an embodiment of the system according to the present invention, the interference per element is established as an average interference power in the given zone per unit of traffic in the other zone, the average interference power being decomposed with regard to the number of active mobile radio stations in the other zone. Thus, an average interference contribution caused by mobile radio stations in one radio zone to a radio base station in another radio zone is achieved, obtained average interferences for all pairs of radio zones forming the interference matrix. With an increasing number of mobile radio stations per radio zone the deviation of the interference signal from its average tends to zero. When the traffic is only ordinary telephone traffic, the statistics can be determined per mobile user. When more services, such as data services, are involved, the statistics can be determined on the basis of the sum over the data rates over all currently active mobile radio stations.

In a further embodiment of the system according to the present invention, the average interference power per unit of traffic is determined from the average interference power in the given zone per unit of transmitting power per unit of traffic in the other zone, multiplied by the average transmitting power per unit of traffic. By also taking into account the transmitting powers in the other zone, in addition to the number of mobile users in the other zone, more accurate statistics are achieved, albeit with more effort because of an extra parameter to be determined per mobile user, and the increased data exchange between a control arrangement for processing the data and the radio base stations. As a statistical method linear regression can be applied to the acquired interference data. For establishment of interference for more than one pair of radio zones simultaneously, a multi-dimensional linear regression method can be applied. Such linear regression methods are well-known per se, and can be found in numerous handbooks, e.g. "Advanced Engineering Mathematics", E. Kreyszig, John Wiley & Sons, 1979, pp. 934–939.

In an embodiment of the system according to the present invention, access control means for controlling access of mobile radio stations to radio zones, the access control means using the established interference matrix for optimizing access per radio zone, under the constraints of given upper limits for interference levels per radio zone, and a given optimizing criterion. Thus, fully automatic access control is achieved, whereby in each radio zone the interference remains below a given threshold value. Generally, the optimizing problem according to the present invention is an optimization of a system of inequalities with non-negative coefficients. For solving this optimizing problem, well-known linear programming methods can be applied, such as the Simplex method which is disclosed in numerous handbooks, e.g. "Operations Research", F. S. Hillier et al., Holden-Day, Inc., 1974, pp. 15–97, pp. 671–690. When applying non-linear objective functions, when optimizing, a non-linear programming method can be applied, such as disclosed on pp. 722–737 of said handbook of Hillier.

Further embodiments are claimed in the dependent claims, and relate to the choice of objective functions in the optimizing method according to the present invention. One objective function is maximizing the overall traffic in the system. Other or additional objective functions are, as the case may be, minimizing rejected traffic per radio zone, minimizing an average blocking probability per radio zone, applying minimum local blocking factors, minimising a worst case blocking probability, avoiding a dropped handover when active mobile radio stations cross radio zone boundaries, or the like, or a linear combination of such criteria as an optimizing criterion. Also stepwise optimization could be applied, i.e. first the optimizing problem could be solved partially, given a number of constraints as above, and then a better solution could be searched for without applying a previously applied constraint.

BRIEF DESCRIPTION OF THE DRAWINGS

The present invention will now be described, by way of example, with reference to the accompanying drawings, wherein FIG. 1 schematically shows a spread-spectrum based cellular mobile radio system according to the present invention, FIG. 2 schematically shows a radio base station according to the present invention, FIG. 3 schematically shows a mobile radio station according to the present invention, FIG. 4 schematically shows a control arrangement according to the present invention.

Throughout the figures the same reference numerals are used for the same features. Throughout the description matrices and vectors are shown bold-faced.

DETAILED DESCRIPTION OF THE PREFERRED EMBODIMENTS

Figure 1:
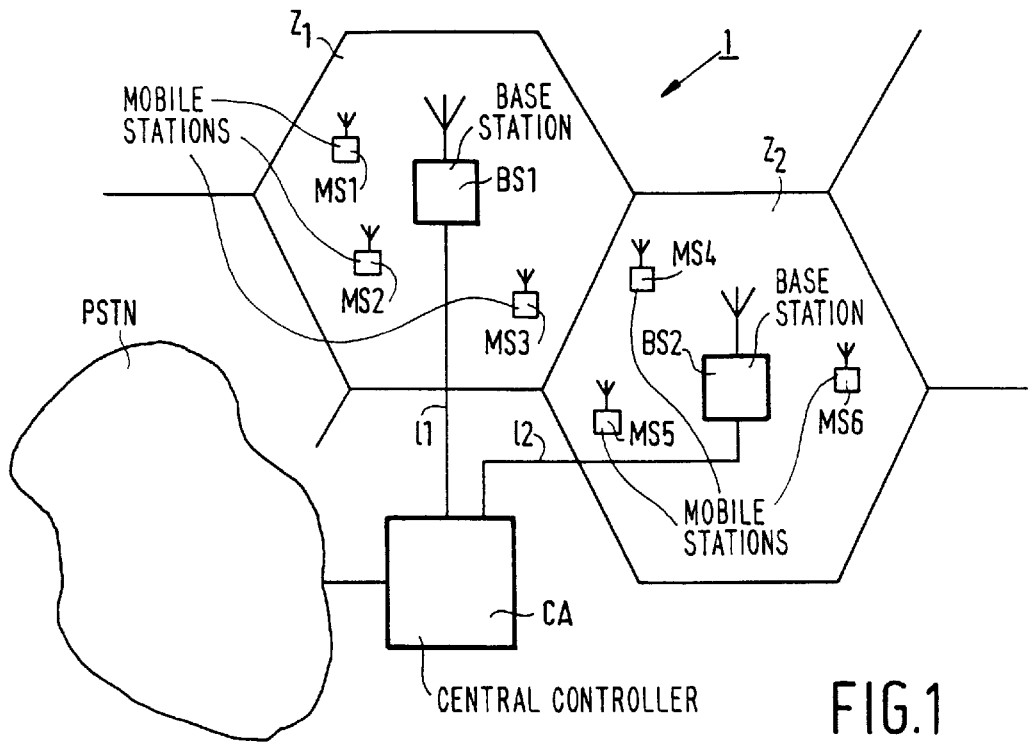

FIG. 1 schematically shows a spread-spectrum based cellular mobile radio system 1 according to the present invention, comprising a number of base stations BS1 and BS2 covering respective radio zones Z1 and Z2. Each radio zone services a number of mobile radio stations MS1, MS2 and MS3, and MS4, MS5, and MS6, respectively. The radio base stations BS1 and BS2 are coupled to a central control arrangement CA via landlines 11 and 12. As to the implementation of the present invention, the central control arrangement CA can be part of a so-called mobile switching centre (not shown in detail) or can at least partially be distributed over the system. E.g., for the purpose of implementing the present invention, the system can comprise several control arrangements which are coupled to each other, each control station being coupled to a number of radio base stations. In the sequel it will be assumed, for simplicity, that a single control arrangement CA exists for the whole system. It is of importance that local data generated at the radio base stations can be brought together for evaluation and control purposes and that control data can be fed from a central site in the system to the radio base stations. According to the present invention, among other tasks, the control arrangement CA can inform system operating personnel about mutual interference between radio zones, or can autonomously determine the number of allowed mobile users to a radio zone, i.e. can implement system access control. The central control arrangement CA may be coupled to the public telephone switching network PSTN. The radio base stations are arranged for processing spread spectrum signals transmitted by the mobiles, i.e for processing uplink spread spectrum signals. Also the mobiles can be arranged to process spread spectrum signals from the base stations, i.e. can process downlink spread spectrum signals. Also hybrid systems are possible, e.g. FDMA (frequency division multiple access) transmission in the downlink direction and CDMA transmission in the uplink direction. The radio base stations can even be arranged for processing signals from FDMA operating mobiles and CDMA operating mobiles, or for processing other combinations of signals. In the sequel, operating in CDMA mode according to the present invention will be described. A CDMA radio system is a multiple access system operating according to spread spectrum techniques, i.e. after coding and/or interleaving of datastreams, as the case may be, these datastreams are frequency spread before transmission. At a reception side a received signal is despread, and de-interleaved and/or decoded, as the case may be. In the given example, DS SS (direct sequence spread spectrum) is applied, whereby a pseudo-random noise sequence is applied to a datastream, e.g. in case of a BPSK (binary phase shift keying) modulated binary datastream, the BPSK modulated datastream and the pseudo-noise sequence are applied to a modulo-two adder, at an output of which a spread datastream occurs. Despreading at receiver side is then achieved by applying the same pseudo noise sequence, which must thus be known in the receiver, to the received signal. The present invention is not limited to BPSK, but other modulation method may be used. The present invention is also not limited to DS SS, but also Frequency Hopping Spread Spectrum can be applied. For a more detailed description of Spread Spectrum techniques, referred is to chapter 8 of the handbook, "Digital Communications", J. Proakis, McGraw-Hill 1989, ISBN 0-07-050937-9.

Figure 2:
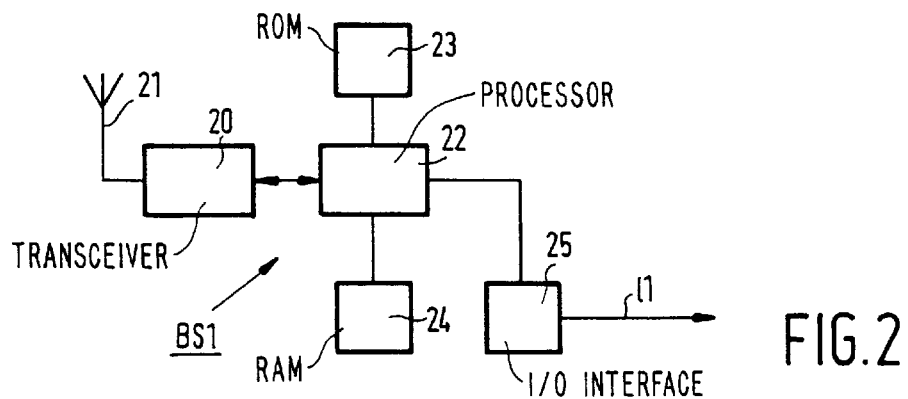

FIG. 2 schematically shows the radio base station BS2 according to the present invention, comprising a spread-spectrum transceiver 20 with integrated baseband demodulator and modulator, coupled to an antenna 21, the transceiver 20 being known per se and further being coupled to a processor 22. The processor 20 is coupled to a ROM (Read Only Memory) 23, loaded with a program implementing the present invention as far as the radio base station BS1 is concerned, and further to a RAM (Random Access Memory) 24 for storing temporary data such as measured interference data. The processor 22 is coupled to the landline 11 via an I/O-interface 25 (Input/Output) for exchanging data with the control arrangement CA. The radio base station BS1 is arranged for carrying out uplink measurements as will be described in the sequel.

Figure 3:
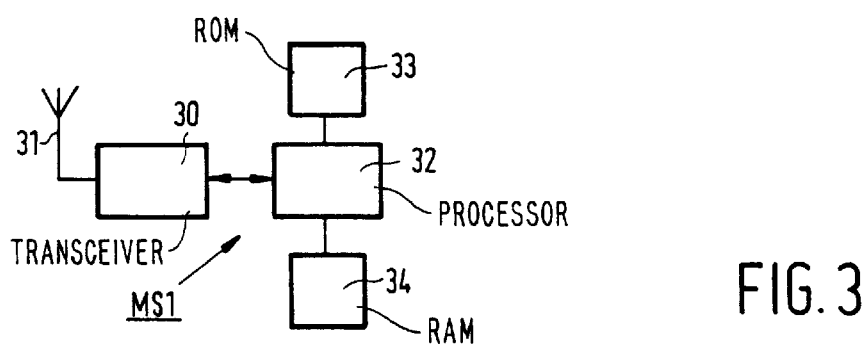

FIG. 3 schematically shows the mobile radio station MS1 according to the present invention, comprising a spread-spectrum transceiver 30, an antenna 31, a processor 32, a ROM 33, and a RAM 34. The mobile radio station MS1 is arranged for carrying out downlink measurements as will be described in the sequel. Measurement data acquired by the mobile radio stations are submitted to the relevant radio base station by air, i.e. wireless.

Figure 4:
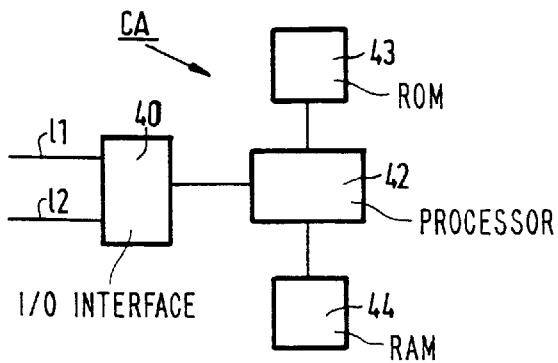

FIG. 4 schematically shows the control arrangement CA according to the present invention, comprising an I/O-interface 40, a processor 42, a ROM 43, and a RAM 44. The ROM 44 is loaded with a program so as to implement the present invention. The radio base stations and the central arrangement CA exchange data. In the given example a single control arrangement is shown. The functionality of the control arrangement may also be distributed, to other control arrangements, in an extreme situation each radio base station having its own control arrangement.

Figure 5:
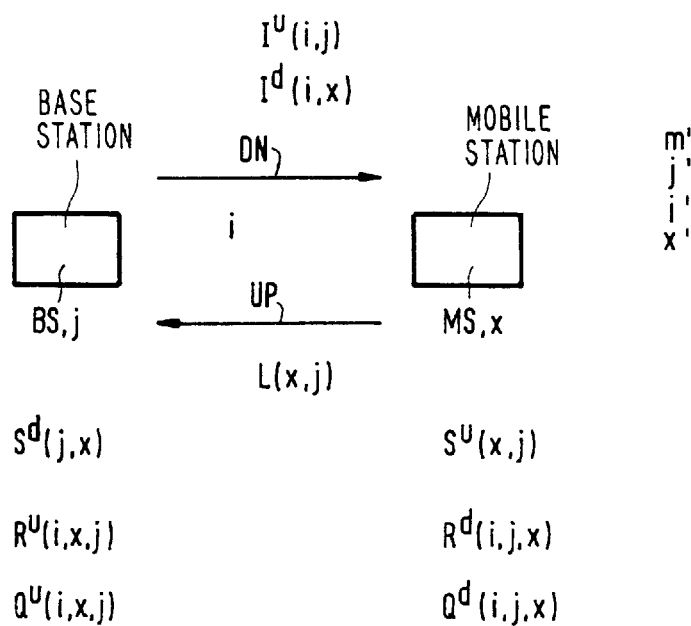
FIG. 5 shows a radio base station and a mobile station in the system for illustrating the operation of the present invention.
Figure 5:

FIG. 5 shows a radio base station BS at a location j and a mobile station MS at a location x in the system 1, for illustrating the operation of the present invention. Further shown is a downlink direction DN from the base station BS to the mobile station MS, and an uplink direction from the mobile station MS to the base station BS. According to the present invention it has to be decided how many users can be allowed to have access in radio zones on a given carrier frequency. It is to be realized that giving users in a given radio zone access to this zone will influence the signal-to-interference ratio of neighbouring radio zones, and herewith the maximum number of simultaneous calls in these neighbouring radio zones. After interference measurements and carrying out an optimizing method as to these measurements, traffic load per radio zone can be adjusted automatically. The acquired measurement can also be used for informing system operating personnel, in a operations and maintenance centre, thus allowing for semi-automatic operation of the system on the basis of the interference measurements. The system disposes of at least one carrier frequency for spread-spectrum transmission and reception, around which fixed transmission bands are available. The radio access to the carriers is such that a variable number of users can use these frequencies for telephone calls or other forms of communication. In a CDMA system, to each call a different code is allocated. In a frequency hopping spread-spectrum system, to each time slot a different carrier frequency within the available band is pseudo-randomly allocated. When too many users are allowed to have access in a given radio zone, this could lead to inadmissible interference in another radio zone. In the example given, for simplicity, it is assumed that each call in a given radio zone interferes with all calls in a neighbouring cell to the same extent. Then, interference can be modelled for pairs of radio zones as follows. For the radio base station BS at the location j with regard to the location x, a radio path loss is given by $L(x,j)$. A call exists between the mobile radio station MS at the location $x(MS)$ and the base station $BS(MS)$ via a radio channel $i(MS)$. As to the uplink, indicated with superscript u, and as to the downlink, indicated with superscript d, the following variables can be defined in view of interference measurements: transmitting powers $S^u(x,j)$, and $S^d(x,j)$, reception powers $R^u(i,x,j)$, and $R^d(i,j,x)$, interference powers $I^u(i,j)$, and $I^d(i,x)$, and signal-to-interference ratios $Q^u(i,x,j)$, and $Q^d(i,j,x)$. In FIG. 5, a neighbouring radio zone j', calls m' at a location x' in the neighbouring radio zone j', and a further radio channel i' are indicated. With an assumed uniform receiver sensitivity equal to one, the following relationships hold:

$$R^u(i,x,j)=S^u(x,j).L(x,j)+I^u(i,j) \quad (1)$$

$$Q^u(i,x,j)=S^u(x,j).L(x,j)/I^u(i,j) \quad (2)$$

$$R^d(i,j,x)=S^d(j,x).L(x,j)+I^d(i,x) \quad (3)$$

$$Q^d(i,j,x)=S^d(j,x).L(x,j)/I^d(i,x) \quad (4)$$

The interference signal can be decomposed into the contributions of the individual other calls m' as follows:

$$I^u(i,j)=\Sigma_1\Sigma_2\alpha_{ii'(m')}.S^u(x'(m'),j').L(x'(m'),j) \quad (5)$$

$$I^d(i,x)=\Sigma_1\Sigma_2\alpha_{ii'(m')}.S^d(j',x'(m')).L(x,j') \quad (6)$$

The summation $\Sigma_1$ is taken over the radio base stations j', and the summation $\Sigma_2$ is taken over the active calls of mobile radio stations m' in a radio zone j' at a channel i'. $\alpha_{ii'}$ is a cross-talk factor denoting which contribution of a signal at the channel i' of a receiver, which is tuned to a channel i, is received. For i=i', this factor is equal to 1. For a CDMA system, for the same carrier frequency, this factor corresponds to the so-called frequency spread factor (see said handbook of Proakis). For packet transmission, for the same carrier frequency, this factor corresponds to the collision probability of packets.

The above summations can be decomposed into the contributions of separate neighbouring radio zones j'. In this respect it is to be realized that the cross-talk factors are known in principle, and that the momentary transmission powers can be acquired, but that neither the location of the mobile radio stations nor the resulting path losses are known. The system can influence the interference by limiting the number of mobile radio stations in a neighbouring radio zone. In the sequel it is assumed that the cross-talk factors are equal for all receiving channels, and herewith the interference. For CDMA this assumption holds.

For carrying out said decomposition, the total interference from all neighbouring radio zones j' to a given radio zone j is acquired. To this end, the radio zone j records its interference level at a given carrier frequency $f_m$ and the radio zone j' records the amount of its current traffic on this carrier frequency. In a first embodiment, interference measurement is achieved by tuning the receiver of the radio base station or the mobile radio station to an idle channel for a given period of time, a receiving level of this channel being sensed. In a CDMA system this can be done by decoding the received signal with a currently unused code. In a second embodiment, the interference level is measured by inhibiting the transmitting partner, i.e. the radio base station in downlink direction and the mobile radio station in uplink direction, to transmit for a short period of time. On the uplink, all mobile radio stations in the radio zone j may be inhibited as well during this short period of time. On the downlink, transmission to all mobile radio stations may be inhibited for the short period of time. In any case, the received signal is only due to signals from other radio zones. In a third embodiment, the reception level and the bit error rate BER are continuously measured. Based upon experiments and calculations, calibration curves can be established showing the dependency of the BER with respect to the signal-to-interference ratio. Since both reception level and BER have been continuously measured, the interference level can be deduced therefrom. All three embodiments for measuring the interference apply for the uplink and for the downlink direction, and may be combined. If on the uplink the reception level is kept constant, and for the downlink direction the transmission level is kept constant, it may be sufficient only to observe the downlink or the uplink. The mobile radio stations send measuring reports to the radio base station to which they are allocated. All measured interference signals, together with the number of active users per radio base station, are transmitted from the radio base stations to the central control arrangement CA via the landlines 11, 12, the processor 42 of which carrying out said decomposition per radio base station BS at the location j. For getting statistically valid interference data, the measurements are repeated a number of times, and linear regression is applied to the measurement data to acquire statistics thereof. Herewith, and with the above formulas (5) and (6) it follows that:

$$I^u(j)_{av} = \alpha_{ij'} \cdot \Sigma \#(\text{active calls in radio zone } j') \cdot (S^u(x',j') \cdot L(x',j))_{av} \quad (7)$$

$$I^d(j)_{av} = \alpha_{ij'} \cdot \Sigma \#(\text{active calls in radio zone } j') \cdot (S^d(j',x') \cdot L(x,j'))_{av} \quad (8)$$

av denoting an average value, and # denoting a number of. The summation $\Sigma$ is taken over the radio base stations j'. Accordingly, a linear relationship is achieved between the average received interference power and the number of active users.

Or, briefly stated, the mutual interference between the radio zones j and j' is acquired by acquiring the average interference power at the radio base station j, separated to the number of active users at the radio base station j', and herewith the average interference power in the radio zone j per user in the radio zone j' is acquired.

Figure 6:
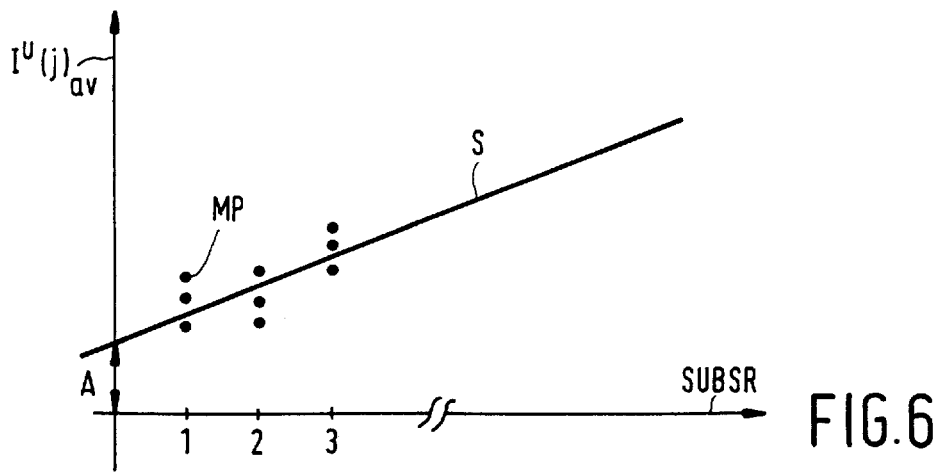
FIG. 6 shows a number of measuring points, indicated with dots, for the average interference power at a given radio base station j, separated to the number of active subscribers at a neighbouring radio base station.

FIG. 6 shows a number of measuring points MP, indicated with dots, for the average interference power $I^u(j)_{av}$ at the radio base station j, separated to the number of active subscribers SUBSCR at the radio base station j'. A slope S is obtained by applying a linear regression to the measuring points MP, the slope S representing the average interference power in radio zone j per active user in radio zone j'. The intersection A at the origin of the diagram represents the total average interference from other radio zone than j and j'. For ordinary telephony, the number of active users SUBSCR is displayed on the abscissa. When more than one service is available, such as data services at different bit rates, the sum of bit rates over all active mobile radio stations can be taken as a parameter on the abscissa. When interference measurement data of all radio base stations are available at the central control arrangement CA simultaneously, multi-dimensional regression can be applied, for computational efficiency.

In the above embodiment, for acquiring the average interference in the radio zone j per user in the radio zone j', the number of active users in neighbouring cells was taken into account. For a more accurate establishment of this average interference, also the respective transmitting powers per active call can be taken into account, albeit with more effort. To this end the radio base stations acquire data as to transmitting powers in their radio zone and transmit these power data to the central control arrangement CA. Then, with the formulas (5) and (6) it follows.

$$I^u(j)_{S,av} = \alpha_{ij'} \cdot \Sigma_1 L(x',j)_{av} \cdot \Sigma_2 S^u(x',j') \quad (9)$$

$$I^d(j)_{S,av} = \alpha_{ij'} \cdot \Sigma_1 L(x,j')_{av} \cdot \Sigma_2 S^d(j',x') \quad (10)$$

Thus, mutual interference relationships between the radio zones j and j' are acquired by acquiring a number of measuring points for the interference power in the radio zone j and the sum of the transmitting powers in the radio zone j'. From these measurements the average interference power in the radio zone j per unit of transmitting power in the radio zone j' is achieved, e.g. by means of linear regression. With this average interference power, the average interference power per user $I^u(j)_{av}$ and $I^d(j)_{av}$ in the radio zone j' can be obtained by multiplying this average interference power by the average transmitting power per user in the radio zone j'.

The above acquired average mutual interferences per mobile user can be applied for automatic access control of users to radio zones. To this end, the central control arrangement carries out an optimization process, using the acquired average interferences, $I^u(j)_{av}$ and $I^d(j)_{av}$. For all pairs of radio zones i and j, the control arrangement CA forms an interference matrix A, elements of which representing interference introduced in one radio zone per unit of traffic in another radio zone, as described.

Figure 7:
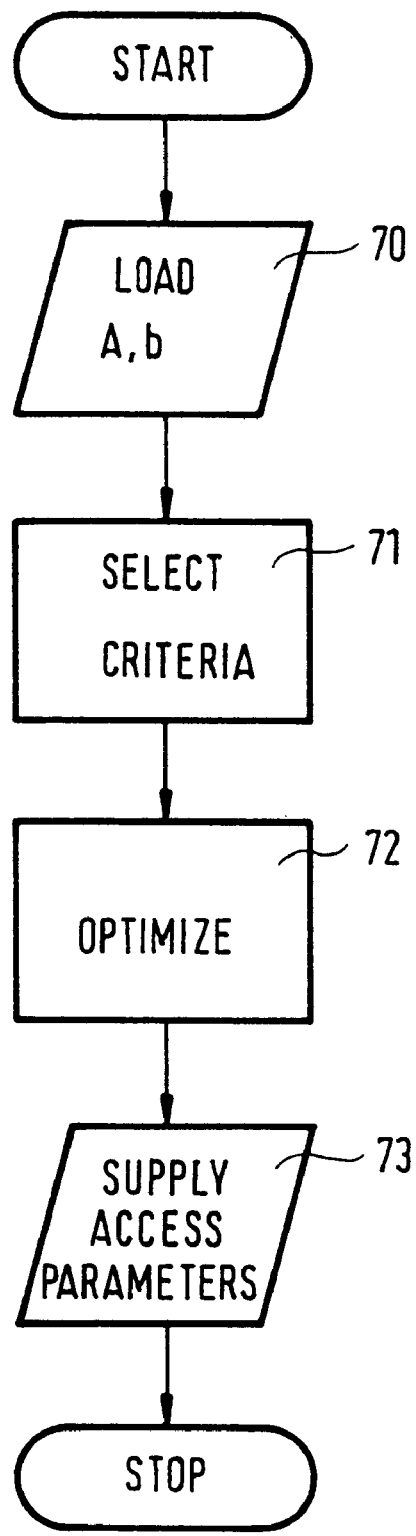
FIG. 7 shows a flowchart depicting the optimization process which is carried out in the control arrangement CA.

In FIG. 7 a flowchart is shown depicting the optimization process which is carried out in the control arrangement CA. First, in block 70, the interference matrix A and a vector b are loaded, elements $b_i$ of the vector b representing upper limits for the interference levels in the respective radio zones i. The upper limits are chosen such that calls in the corresponding radio zones i are not disturbed in an unacceptable way. A vector x is defined representing the traffic in the radio zones. The optimization problem to be solved, e.g. by means of a well-known Simplex method as described said handbook of Hillier, is how to find an optimum upper limit vector x for the traffic in the radio system 1, i.e. how to find x such that $Ax \leq b$. The system should not be overloaded such that the quality of calls becomes unacceptable. In block 71 optimization criteria are selected. In block 72, the optimization is carried out. In block 73 access control parameters are obtained as a result of the optimization process. In an operative radio system 1 usually not all mobile users can be served, i.e. a certain amount of traffic has to be rejected. It depends upon the system operator according to which criteria the system is optimized. On the one hand, an operator is interested in the best overall performance of the system in terms of simultaneous calls, but on the other hand, for customer satisfaction it is not desirable that the network is hardly reachable at some locations, or even worse that calls are dropped when a mobile user is roaming through the system. In a first optimizing embodiment according to the present invention simply global optimizing is done, i.e. the overall traffic is optimized by applying an objective function $$\Sigma x_i = \text{maximal},$$

as an optimizing criterion.

Herewith, radio zones with few traffic demand will be allowed to much traffic at the cost of other radio zones with much traffic demand. This would lead to too many rejected calls in certain radio zone.

In parallel to the above optimizing it could be tried to minimize rejected traffic by determining the average traffic demand per radio zone using appropriate statistics as to call requests and handover requests. Then, a traffic demand vector y is defined, elements of which representing the traffic demand per radio zone. In optimizing the traffic in the system, first a partial optimizing is carried out trying to satisfy the average traffic demand as far as possible before additional peak traffic from other cells is accepted. I.e., first the control arrangement CA solves the optimizing problem as before, but with an additional constraint $x' \leq y$. If there is still some spare capacity left, this capacity is allocated in a second step by solving the optimizing problem as before under the constraint $x \leq x'$.

The previous criteria could lead to a situation in which large cells have all their traffic demand satisfied, whereas some small cells nearly get nothing. This situation can be avoided by applying the criterion $\Sigma x_i/y_i = \text{max.}$, instead of $\Sigma x_i = \text{max.}$ As before, to avoid that capacities are allocated to the wrong base stations, in a first optimization step, the additional constraint $x' \leq y$ is applied.

In some occasions, with the above optimization it could happen that the average blocking is minimized because of the fact that some radio zones are given a very low traffic capacity. Then, the system would be hardly reachable at some locations. When a given minimum standard is desirable, further constrains can be added, such as $x_i/y_i \geq$ (1-γ), γ representing a maximum allowable blocking probability. When γ becomes too low, the optimization problem could have not solution at all. In the alternative, a solution having the lowest possible maximum blocking rate could be tried and found. Then γ could be taken as an additional variable in the optimization process.

Furthermore, situations like a dropped handover are to be avoided, as these situations of call interruption are experienced as very annoying by mobile users. Such a situation could occur if the optimization process would produces islands of high blocking probability. For avoiding such situations, at least interference traffic flowing into a radio zone could be served. To this end, the control arrangement acquires statistics about inter-cell handovers. Taking into account call holding times in the respective radio zones, the control arrangement CA can determine the traffic in each radio zone due to handovers from another radio zone. The acquired handover data are stored in a handover matric H, and an additional constraint $Hx \leq x$ is added to the optimizing process.

Depending on the strategy to be chosen by the system operator, various of the above optimizing strategies can be combined. Another optimizing criterion could be formulated, being a linear combination of some of the above strategies. Also, the optimization process could be carried out in steps. First, an optimum could be found, given a number of constraints. Then, a better solution could be looked for, without applying these constraints. For exchanging of data between radio base stations, various access networks could be used, such as a local area network or a metropolitan area network.

We claim:

1. A spread-spectrum based cellular mobile radio system comprising:
   at least two radio base stations covering radio zones each of said base stations including a spread-spectrum transceiver;
   a plurality of mobile radio stations, each of which include a spread-spectrum transceiver; and
   means for dynamically establishing inter-zone interference information introduced in a given zone per unit of traffic in another zone and for controlling and optimizing access of said mobile radio stations to the radio zones.

2. A spread-spectrum based cellular mobile radio system according to claim 1, wherein the interference information is stored in a matrix (A) of elements $(I^u(j)_{av}, I^d(j)_{av})$ which express the interference.

3. The spread-spectrum based cellular mobile radio system as claimed in claim 1, wherein the interference per element is established as an average interference power $(I^u(j)_{av}, I^d(j)_{av})$ in the given zone per unit of traffic in the other zone, the average interference power being decomposed with regard to a number of active mobile radio stations in the other zone.

4. The spread-spectrum based cellular mobile radio system as claimed in claim 1, wherein the interference information is stored in a matrix of elements $(I^u(j)_{av}, I^d(j)_{av})$ which express the interference and the interference per element is established as an average interference power $(I^u(j)_{av}, I^d(j)_{av})$ in the given zone per unit of traffic in the other zone, the average interference power being decomposed with regard to a sum of data rates over all active mobile radio stations.

5. A spread-spectrum radio system according to claim 3, wherein the average interference power per unit of traffic $(I^u(j)_{av}, I^d(j)_{av})$ is determined from the average interference power $(I^u(j)_{S,av}, I^d(j)_{S,av})$ in the given zone per unit of transmitting power per unit of traffic in the other zone, multiplied by an average transmitting power per unit of traffic.

6. The spread-spectrum based cellular mobile radio system as claimed in claim 1, wherein the interference information is stored in a matrix of elements $(I^u(j)_{av}, I^d(j)_{av})$ which express the interference and the interference per element $(I^u(j)_{av}, I^d(j)_{av})$ is determined by means of a linear regression applied to a number of interference measuring points.

7. A spread-spectrum based cellular mobile radio system comprising:
   at least two radio base stations covering radio zones;
   a plurality of mobile radio stations; and
   statistics based inter-zone interference establishing means for establishing inter-zone interference information introduced in a given zone per unit of traffic in another zone, wherein the interference information is stored in a matrix of elements $(I^u(j)_{av}, I^d(j)_{av})$ which express the interference; and
   access control means for controlling access of mobile radio stations to radio zones, the access control means using the established interference matrix for optimizing access per radio zone, under the constraints of given upper limits for interference levels per radio zone, and a given optimizing criterion.

8. The spread-spectrum radio system as claimed in claim 7, wherein the optimizing criterion is a maximizing of a total allowed traffic in the radio zones.

9. A spread-spectrum based cellular mobile radio system comprising:
   at least two radio base stations covering radio zones;
   a plurality of mobile radio stations; and
   statistics based inter-zone interference establishing means for establishing inter-zone interference information introduced in a given zone per unit of traffic in another zone, said interference information being stored in a matrix of elements $I^u(j)_{av}, I^d(j)_{av}$ which express the interference;
   access control means for controlling access of mobile radio stations to radio zones, the access control means using the established interference matrix (A) for optimizing access per radio zone, under the constraints of given upper limits (b) for interference levels per radio zone, and a given optimizing criterion, the optimizing criterion being a maximizing of a total allowed traffic ($\Sigma x_i$=max) in the radio zones;
   wherein an additional optimizing criterion ($x' \leq y$) is a minimizing of rejected traffic in radio zones based upon a traffic demand vector.

10. A spread-spectrum radio system according to claim 7, wherein the optimizing criterion is a maximizing of a total allowed traffic per traffic demand ($\Sigma x_i/y_i$) per radio zone.

11. A spread-spectrum radio system according to claim 10, wherein an additional optimizing criterion is that the allowed traffic per traffic demand ($x_i/y_i$) exceeds a given threshold value (1−y).

12. A spread-spectrum radio system according to claim, wherein priority is given to an incoming handover traffic entering a given radio zone.

13. A control arrangement for use in a spread-spectrum based cellular mobile radio system comprising at least two radio base stations covering radio zones, a plurality of mobile radio stations, and means for establishing inter-zone interference information introduced in a given zone per unit of traffic in another zone, said interference information being stored in a matrix of elements which express the interference, and for controlling access of the mobile radio stations to radio zones, wherein the control arrangement comprises:

means for exchanging data with the radio base stations and the mobile radio stations; and means for optimizing access per radio zone using said matrix under constraints of a given upper limit for interference levels per radio zone and a given optimizing criterion.

14. A radio base station for use in a spread-spectrum based cellular mobile radio system comprising at least two radio base stations covering radio zones each of said base stations including a spread-spectrum transceiver, a plurality of mobile radio stations, each of which include a spread-spectrum transceiver, and statistics based inter-zone interference establishing means for establishing inter-zone interference information introduced in a given zone per unit of traffic in another zone, wherein said radio base station is arranged for establishing interference components from radio zones other than a radio zone into which the radio base station is located.

15. A mobile radio station for use in a spread-spectrum based cellular mobile radio system comprising at least two radio base stations covering radio zones each of said base stations including a spread-spectrum transceiver, a plurality of mobile radio stations, each of which include a spread-spectrum transceiver, and statistics based inter-zone interference establishing means for establishing inter-zone interference information introduced in a given zone per unit of traffic in another zone, wherein said mobile radio station is arranged for establishing information as to interference components for radio zones other than a current radio zone the mobile radio is visiting.

16. A spread-spectrum based cellular mobile radio system comprising:

at least two radio base stations covering radio zones, each of said base stations including a spread-spectrum transceiver; a plurality of mobile radio stations, each of which include a spread-spectrum transceiver; and means for establishing interference components for radio zones other than a current radio zone the mobile radio station is visiting and for dynamically measuring and establishing inter-zone interference information introduced in a given zone per unit of traffic in another zone.

\* \* \* \* \*